Nov. 29, 1960     L. H. VAN BILLIARD     2,961,959
TORPEDO ACTUATING LANYARD SEAL
Filed Oct. 1, 1956
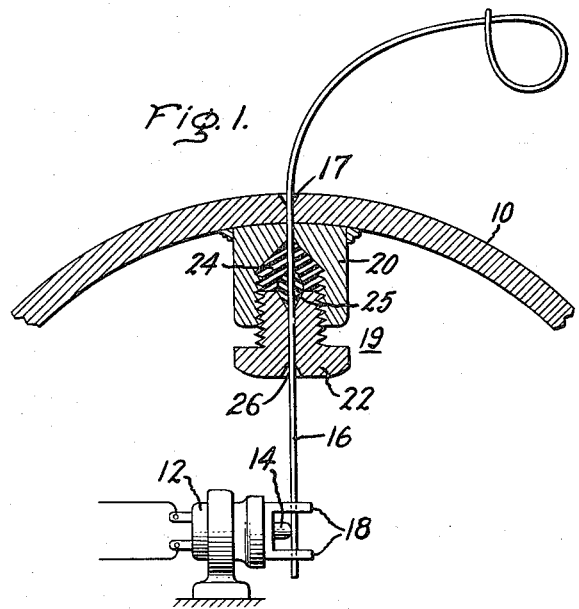
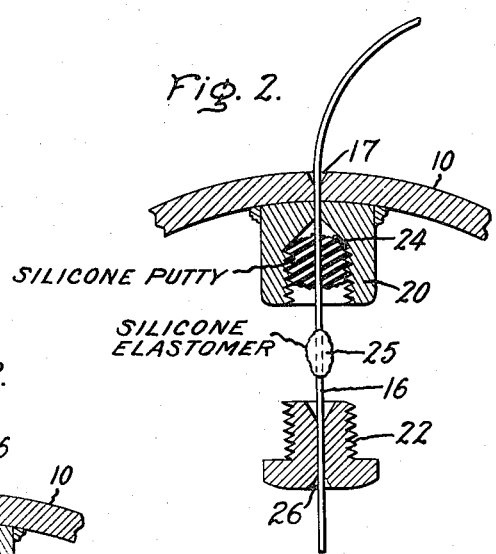
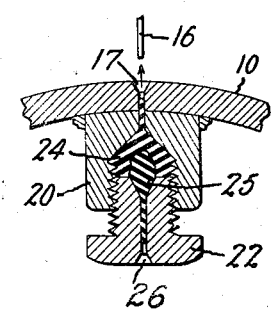
Inventor:
Lewis H. Van Billiard,
by Roe D. M<sup>c</sup> Burnett
His Attorney.

United States Patent Office 2,961,959
Patented Nov. 29, 1960

2,961,959

TORPEDO ACTUATING LANYARD SEAL

Lewis H. Van Billiard, Berkshire, Mass., assignor to General Electric Company, a corporation of New York Filed Oct. 1, 1956, Ser. No. 613,035

2 Claims. (Cl. 102—16)

This invention relates to underwater ordnance actuating devices and fluid pressure seals particularly adapted to use therewith, and has as its principal object the provision of new and improved actuating devices and seals therefor characterized by maximum simplicity and economy of manufacture, and affording effective sealing of the wall opening for the actuating member both when the member is in place and when it has been pulled clear of the opening.

While not limited to use in such application, the seals of the invention find particular utility in sealing torpedo actuating rods or lanyards where the rod passes through the torpedo outer shell. Heretofore it has been the common practice to provide in the torpedo shell an actuator receptacle having O-ring seals about the periphery thereof generally as shown in U.S. Patent No. 2,748,704 to Dinsmoor. The actuating rod is similarly O-ring sealed where it passes into this receptacle, as is also shown in the aforesaid Dinsmoor patent, and at time of use the actuating rod is pulled or otherwise manipulated but is not detached from the torpedo.

These prior actuating rod arrangements are mechanically complex and therefore costly to manufacture. The actuating rod and the receptacle through which it passes interrupt the otherwise smooth skin of the torpedo, thus seriously detracting from its streamlining and inducing cavitation and turbulence in water flow over the torpedo.

The present invention has as one of its objects the provision of underwater ordnance actuating devices not subject to these and other disadvantages of prior such devices. Another object is the provision of underwater ordnance actuating devices which pass through but do not interrupt smoothness of the ordnance device casing, and which effectively seal the casing opening against external water pressure even after the actuating member has been bodily removed from the opening.

It is also an object of the invention to provide fluid seals for linearly movable members, which seals are of general utility but particularly adapted to underwater ordnance use, and are characterized by mechanical simplicity, manufacturing economy and effective sealing action against high fluid pressures over sustained periods.

In carrying out the invention in its preferred form, an underwater ordnance device such as a mine or torpedo is provided with an actuator or like control element mounted within its casing. An actuating member passes through the casing and engages the actuator to control its operation. The actuating member-casing joint is sealed by a stuffing box which contains a sealant such as silicone putty under pressure and may also contain a silicone elastomer under like pressure. In the preferred manner of use, the actuating member is pulled clear of the casing and discarded, and the sealant then fills the spaces left by removal of the actuating member to effectively seal the casing opening against external water pressure.

The invention and its various objects, features and advantages will be further understood by reference to the appended claims and the following detailed description when read in conjunction with the accompanying drawings, wherein:

Figure 1 is a sectional view of a fluid seal constructed in accordance with a preferred embodiment of the invention;

Figure 2 illustrates assembly of the seal of Figure 1; and

Figure 3 illustrates the seal of Figure 1 as it appears after the rod has been pulled clear of the seal.

With continued reference to the drawings, wherein like reference numerals have been employed throughout to designate like elements, Figures 1, 2 and 3 illustrate the invention as applied to sealing of an actuating lanyard for a torpedo, mine or other underwater device, against the sea water pressure to which the device is subjected in use.

In Figure 1, a portion of the cylindrical outer shell of a torpedo is designated by reference numeral 10 and houses within it an electrical switch 12 or other actuator of electrical or mechanical type controlling the energization or arming of the torpedo. The switch 12 shown is provided with a spring loaded plunger 14 which when released trips the actuator and energizes or arms the torpedo. Plunger 14 is held inwardly against the action of its loading spring by a lanyard or actuating rod 16 which passes through aligned bores in a bifurcated member 18 fixed to actuator 12.

When in the position shown, lanyard 16 prevents outward movement of plunger 14 and thus prevents energization or arming of the torpedo until time of use. At time of use, lanyard 16 is pulled free of the actuator and, to minimize water turbulence and improve torpedo streamlining, the lanyard preferably is pulled entirely clear of the torpedo and discarded. The streamlining of the torpedo thus is unimpaired by the actuating rod, and cavitation and water turbulence are minimized.

At lanyard opening 17 in outer shell 10 where lanyard 16 passes through it a fluid pressure seal generally designated by reference numeral 19 is provided. In accordance with the invention this seal is effective not only to seal around the lanyard 16 when it is in place, but also to seal the opening 17 when lanyard 16 is removed in order to preserve the water-tight integrity of the torpedo shell at the relatively high water pressures to which it may be subjected in operation up to from 500 to 600 pounds per square inch.

The seal 19 comprises a stuffing box member 20 formed integrally with the torpedo shell or separately formed and fixed to the shell as by welding as shown. Stuffing box 20 is interiorly threaded to receive a gland nut 22 which may be screwed into the stuffing box to place the contents thereof under desired pressure.

Within the stuffing box there is placed a body of "silicone putty," which material is well known and widely sold under that name and has the properties that it flows when under pressure but does not harden with the passage of time. This silicone putty may be of sufficient volume to substantially fill the stuffing box, as indicated at reference numeral 24 in Figure 1. Preferably the stuffing box also contains a body of one of the well known silicone elastomers, designated by reference numeral 25 in the drawings. Both the silicone putty and elastomer are placed under pressure by the gland nut, so that when the lanyard is pulled free of the stuffing box the pressure packed silicone materials fill the volume formerly occupied by the lanyard and seal the openings left thereby by driving a cylinder of silicone putty outwardly into the bore 17 through casing 10 and a cylinder of the elastomer inwardly into the bore 26 of gland nut 22, as best shown in Figure 3.

This operation is enhanced by the compressibility of the silicone elastomer if used, since the elastomer can readily expand to help fill the void created by removal of the lanyard. The silicone putty provides a particularly effective sealant action including that required to seal the gland nut threads, and it also functions somewhat as a lubricant for the lanyard to thus reduce the pull necessary to remove the lanyard and actuate the torpedo.

Lanyard pull may be further reduced by making the lanyard of piano wire or rod stock having a high surface polish and relatively small diameter. This latter also is of advantage in reducing the area of the openings necessary to be sealed after removal of the lanyard.

While certain specific embodiments of the invention have been shown and described, it will be understood that various other modifications may be made without departing from the invention. The appended claims therefore are intended to cover all such modifications as fall within the true spirit and scope of the invention.

What is claimed as new and desired to be secured by United States Letters Patent is:

1. In a torpedo adapted to be energized by the withdrawal of a lanyard which extends from a device from which the torpedo is launched into the torpedo through a lanyard opening in the outer shell of the torpedo; the improvements comprising means for sealing the lanyard opening after the lanyard has been withdrawn, said means comprising a stuffing box having a central opening mounted on the inner side of the outer shell of the torpedo and surrounding said lanyard opening, the central opening of said stuffing box being partially filled with a silicone putty, a gland nut having an opening through which the lanyard can extend into the interior of the torpedo, said gland nut being threaded into the central opening of the stuffing box to exert pressure on the material within the stuffing box, the pressure being sufficient to cause said material to flow into the lanyard opening of the outer shell of the torpedo after the lanyard has been withdrawn.

2. In a torpedo having an outer shell, an actuator mounted within the shell, and a lanyard opening in the outer shell through which a lanyard is adapted to extend from the actuator to the vehicle from which the torpedo is discharged, said lanyard adapted to be pulled completely out of the torpedo when the torpedo is discharged from said vehicle; the improvements comprising a stuffing box mounted on the inner side of the outer shell of the torpedo around the lanyard opening, the interior of said stuffing box containing a quantity of silicone putty and a silicone elastomer which substantially fills the stuffing box, a gland nut having a central opening through which the lanyard is adapted to pass, said gland nut being threadably secured to said stuffing box to exert pressure on the silicone putty and elastomer to prevent water from flowing through the lanyard opening into the torpedo after the lanyard has been pulled out of the torpedo, even when the pressure difference between the water surrounding the torpedo and the interior of the torpedo is on the order of several hundred pounds per square inch.

References Cited in the file of this patent
UNITED STATES PATENTS

| Number | Name | Date |
|---|---|---|
| 467,792 | Elliott | Jan. 26, 1892 |
| 1,189,465 | Mayo | July 4, 1916 |
| 2,541,851 | Wright | Feb. 13, 1951 |
| 2,570,853 | Pierce | Oct. 9, 1951 |
| 2,608,545 | Warrick | Aug. 26, 1952 |
| 2,760,894 | Wolf | Aug. 28, 1956 |
| 2,811,190 | Iknayan et al. | Oct. 29, 1957 |